United States Patent
Kandala

(10) Patent No.: US 7,372,855 B2
(45) Date of Patent: May 13, 2008

(54) SYSTEM AND METHOD FOR SYNCHRONIZING AN IEEE 802.11 POWER-SAVE INTERVAL

(75) Inventor: Srinivas Kandala, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 930 days.

(21) Appl. No.: 10/648,084

(22) Filed: Aug. 26, 2003

(65) Prior Publication Data

US 2004/0131019 A1 Jul. 8, 2004

Related U.S. Application Data

(60) Provisional application No. 60/438,883, filed on Jan. 8, 2003.

(51) Int. Cl.
 *H04L 12/28* (2006.01)
(52) U.S. Cl. ................................ 370/394; 714/748
(58) Field of Classification Search ..................... None
 See application file for complete search history.

(56) References Cited

U.S. PATENT DOCUMENTS

| | | | |
|---|---|---|---|
| 6,438,123 B1 * | 8/2002 | Chapman | 370/351 |
| 6,463,307 B1 | 10/2002 | Larsson et al. | 455/574 |
| 6,831,912 B1 * | 12/2004 | Sherman | 370/349 |
| 6,895,010 B1 * | 5/2005 | Chang et al. | 370/394 |
| 7,203,182 B2 * | 4/2007 | Hwang | 370/338 |
| 2002/0164976 A1 * | 11/2002 | Chen et al. | 455/414 |

* cited by examiner

*Primary Examiner*—Chau Nguyen
*Assistant Examiner*—Dargaye H Churnet
(74) *Attorney, Agent, or Firm*—Law Office of Gerald Maliszewski; Gerald Maliszewski

(57) ABSTRACT

A system and method are provided for coordinating a power-save interval in an IEEE 802.11 wireless network. The method transmits a first frame from an access point (AP) to a quality of service station (QSTA) and receives an acknowledgement from the QSTA. In response to receiving the acknowledgement, the first frame is retransmitted from the AP to the QSTA and the retransmitted first frame is identified as the last frame in the transmission queue. An acknowledgement is received responsive to the retransmitted first frame and the next minimum service interval is timed in response to the retransmitted first frame.

36 Claims, 4 Drawing Sheets

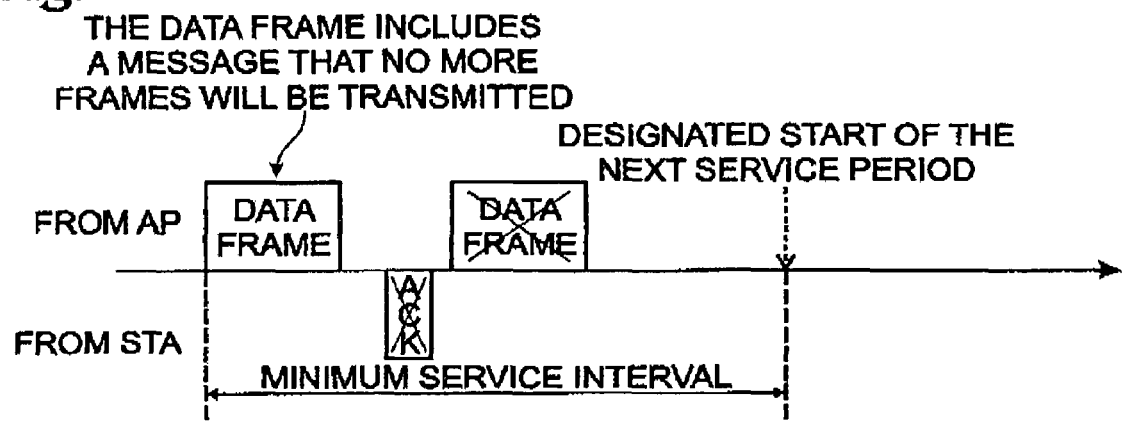
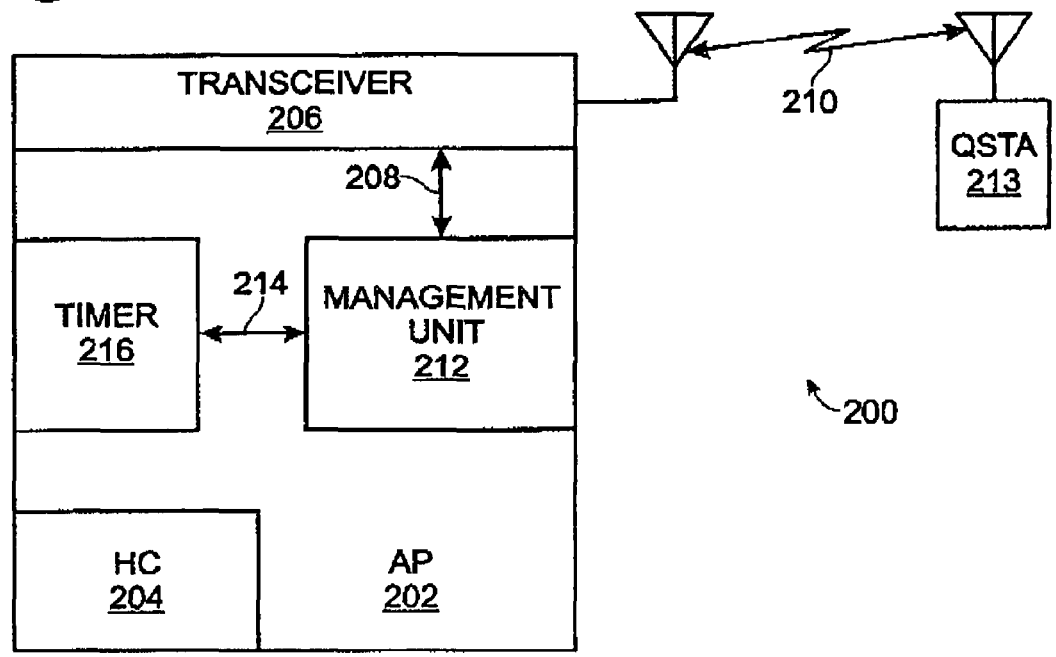

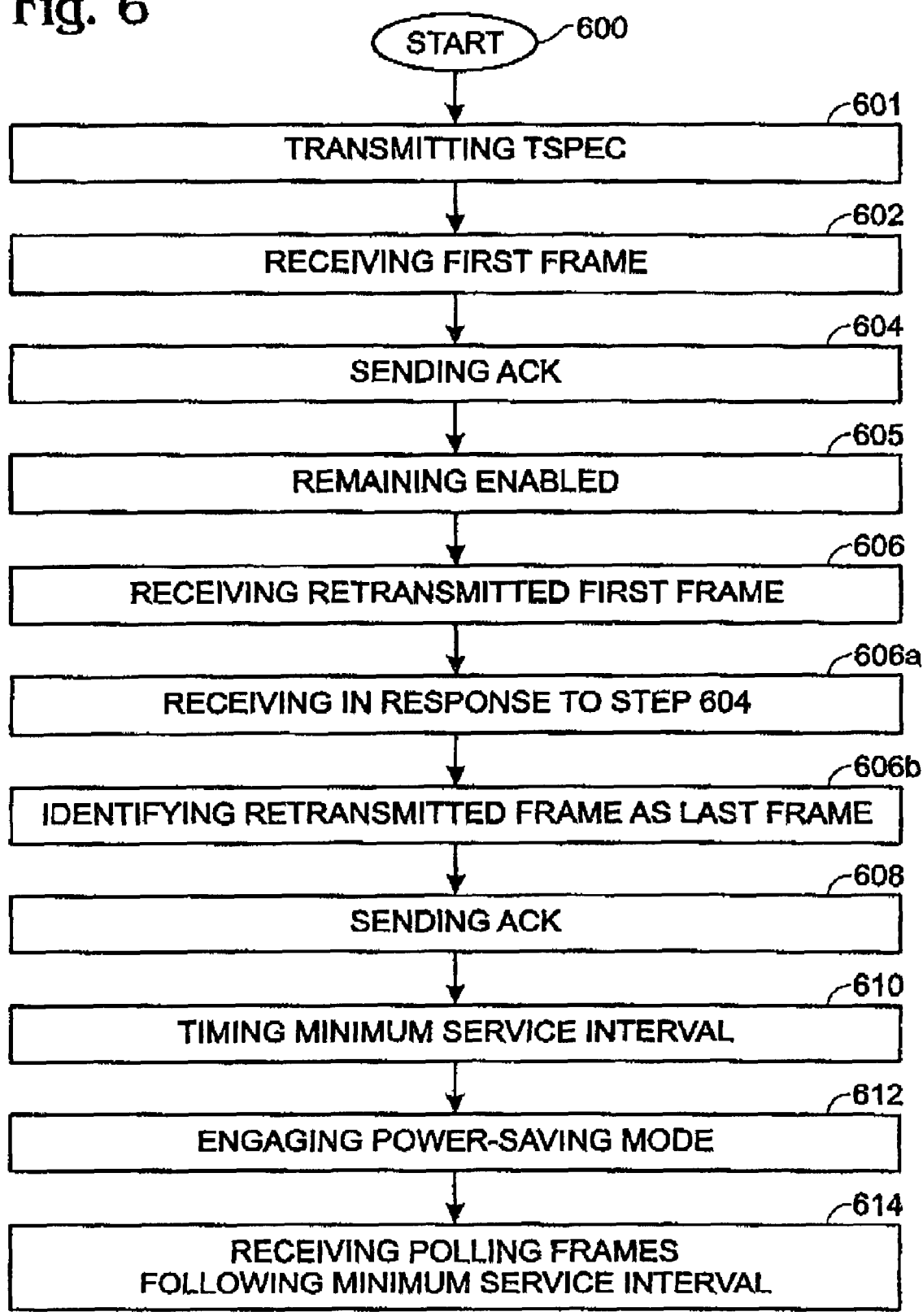

SYSTEM AND METHOD FOR SYNCHRONIZING AN IEEE 802.11 POWER-SAVE INTERVAL

RELATED APPLICATIONS

This application claims the benefit of a provisional application entitled, MECHANISM TO TERMINATE TRANSMISSION BEFORE POWER SAVE BY A STA IN A WIRELESS LAN, invented by Srinivas Kandala, Ser. No. 60/438,883, filed Jan. 8, 2003.

BACKGROUND OF THE INVENTION

1. Field of the Invention

This invention generally relates to wireless local area network (wLAN) communications and, more particularly, to a system and method for synchronizing a power-save for use in 802.11e wLAN communications.

2. Description of the Related Art

A basic service set (BSS), or quality of service BSS (QBSS) typically includes an access point (AP), with a hybrid coordinator (HC), to control quality of service (QoS) traffic. When the AP has only one frame to send during a "service period" to a station (STA), or quality of service STA (QSTA), the STA may receive the frame correctly and acknowledge the frame. However, it is possible that the frame containing the STA acknowledgement may be lost, or not received by the AP. In this circumstance, the AP may retransmit the frame multiple times to insure that the frame is received by the STA. Because of the unknown possibility of these AP retransmissions, neither the AP nor the STA can determine when a service period starts. As a result, there is no means for establishing a service period synchronization that can be used by the AP, as the AP may not be sure of how long must wait before it must transmits frames to the STA. Likewise, if the AP cannot establish a service period, the STA cannot establish a block of time in which it is guaranteed not to receive a transmission. Because of this lack of guaranteed service interval, the STA cannot periodically shut down to save power. The STA cannot go into a power-save mode, even when there are long intervals between AP transmissions. Alternately, if the STA does shut down after receiving a transmission, it may lose synchronization with the AP polling schedule.

FIG. 1 is a timing diagram that illustrates the service period synchronization problem. The AP has only one frame to send. The STA is already awake, receives the frame, and sends an acknowledgement. The STA immediately goes to sleep, as the AP has indicated that there are no more frames to receive. However, the acknowledgement is lost. Because the STA is asleep, all retransmissions from the AP are lost. Shown is a second transmission from the AP that is not acknowledged by the STA. Now, the AP does not know when the STA will be awake again unless the STA initiates a frame to the AP. While the BSS can tolerate this mode of STA operation, the STA may not get access to a channel in time to support an operation, and one or more frames will be dropped at the AP.

It would be advantageous if a power-save interval could be established in a BSS that was known by both the HC and the QSTAs in communication with the HC.

It would be advantageous if battery-operated IEEE 802.11a QSTAs could be synchronized to a minimum service interval to minimize power consumption and prolong life.

SUMMARY OF THE INVENTION

The present invention provides a mechanism to overcome the above-mentioned power-save interval problem. Using the present invention protocol, the AP, when it sends a single frame, does not initially indicate that it is the only frame in the queue for the STA. Likewise, the AP will not send an indication that a frame is the last frame in a series of frames. The STA receives and acknowledges the frame, but does not go back to sleep. The STA is expecting another frame and is awake to receive a retransmission, if one occurs. If the acknowledgement frame is lost, the AP retransmits the same frame and the STA will acknowledge again. The frame retransmission time is set as the starting point of the minimum service interval, or power-save interval. If the acknowledgement frame is not lost, the AP merely transmits a frame signifying the end of the transmission, or the starting point of a power-save interval.

Accordingly, a method is provided for coordinating a power-save interval in an IEEE 802.11 wireless network. The method comprises: transmitting a first frame from an access point (AP) to a quality of service station (QSTA); receiving an acknowledgement from the QSTA; in response to receiving the acknowledgement, retransmitting the first frame from the AP to the QSTA; timing the next minimum service interval in response to the retransmitted first frame; and, in response to receiving the first frame acknowledgement, identifying the retransmitted first frame as the last frame in the transmission queue. Then, timing the next minimum service interval in response to the acknowledgement of the retransmitted first frame includes using the retransmitted first frame as the next minimum service interval timing reference. In this example, the first frame is either the last in a set of frames or the only frame in the set. More specifically, the method additionally comprises receiving an acknowledgement responsive to the retransmitted first frame. Then, the use of the retransmitted first frame as the next minimum service interval timing reference is responsive to receiving the retransmitted first frame acknowledgement.

Note that the retransmitted frame need not necessarily be identical to first frame. The retransmitted frame is used for the purpose of communicating the power-save interval start time to the QSTA. For example, when transmitting the first frame, the AP may set the More Data subfield in the Frame Control field of the first frame header to a value of "1". Then, the AP identifies the retransmitted first frame as the last frame in the transmission queue by setting the More Data subfield to the value of "0".

In other aspects, the method further comprises: failing to receive an acknowledgement from the QSTA in response to transmitting the first frame; and, retransmitting the first frame until an acknowledgement is received. In some aspects, the number of retransmission attempts is limited a specific number, or a number that is adaptive to channel conditions or capacity.

Additional details of the above-described method and system for coordinating a power-save interval in an IEEE 802.11 wLAN network are provided below.

BRIEF DESCRIPTION OF THE DRAWINGS

FIG. 1 is a timing diagram that illustrates the service period synchronization problem.

FIG. 2 is a schematic block diagram of the present invention system for coordinating a power-save interval in an IEEE 802.11 wireless network.

FIG. 6 is a flowchart illustrating the present invention method for a QSTA to synchronize a power-save interval in an IEEE 802.11 wireless network.

DETAILED DESCRIPTION OF THE PREFERRED EMBODIMENTS

Figure 3:
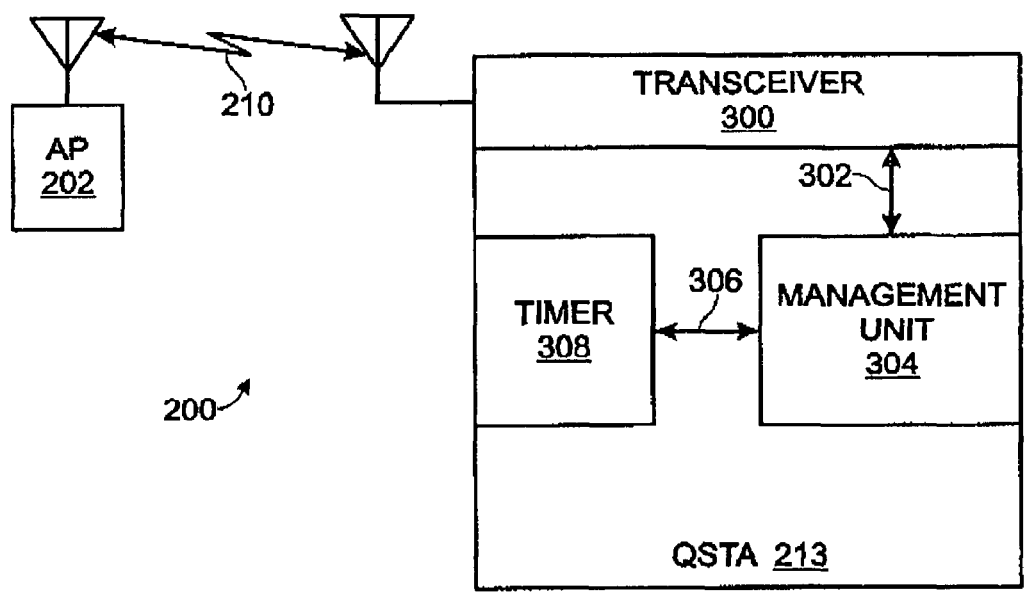
FIG. 3 is a schematic block diagram illustrating details of the QSTA of FIG. 2.

FIG. 2 is a schematic block diagram of the present invention system for coordinating a power-save interval in an IEEE 802.11 wireless network. The system 200 comprises an access point (AP) 202, which is understood to include a hybrid coordinator (HC) 204. The AP 202 also includes a transceiver 206 having a wireless media port for transmitting and receiving frames, and a control port on line 208 to communicate transceived information. Reference designator 210 is intended to represent wireless communications. A management unit 212 has a signal port connected to the transceiver control port on line 208 to manage transceiving. The management unit 212 orders the transmission of a first frame to a quality of service station (QSTA) 213, and the retransmission of the first frame in response to the transceiver 206 receiving an acknowledgement of the first frame from the QSTA 213. The management unit 212 has a timing port on line 214 to communicate timing information.

A timer 216 has a port connected to the management unit timing port on line 214 to initiate the timing of a minimum service interval for the management unit, in response to the receipt of the first frame acknowledgement. The first frame can be understood to either be the last frame in a series of frames or a single (only) frame.

The management unit 212 orders the transceiver 206 to identify the retransmitted first frame as the last frame in the transmission queue, in response to receiving the acknowledgement from the QSTA. The timer 216 uses the retransmitted first frame as the next minimum service interval timing reference. As explained in more detail below, the retransmitted first frame need not necessarily be identical to the first frame. The retransmitted frame need only communicate that the AP 202 received the previous acknowledgement from the QSTA 213. Alternately stated, the retransmitted first frame need only signal the start of the power-save interval.

More specifically, the management unit 212 receives an acknowledgement for the retransmitted first frame and orders the timer to use the retransmitted first frame as the next minimum service interval timing reference, in response to receiving the retransmitted first frame acknowledgment. In the event that the management unit 212 does not receive an acknowledgement (ACK) in response to the first frame retransmission, the first frame is retransmitted again. In one aspect, the retransmissions are repeated until an ACK is received. Alternately, the management unit 212 may only repeat retransmissions a fixed number of times, or an adaptively determined number of times. The QSTA 213 uses the last received retransmission as the start of the minimum service interval. The management unit 212, in response to failing to receive an acknowledgement of the transmitted first frame from the QSTA 213, orders the transceiver 206 to retransmit the first frame until an acknowledgement is received. In some aspects, the number of retransmissions is limited to a specific number. For example, the AP 202 will retransmit the first frame only once. In other aspects, the number of retransmissions is determined adaptively, based upon channel conditions or channel capacity, for example.

Following the receipt of a minimum service interval message from the timer 216, the management unit 212, orders the transceiver 206 to transmit a polling message to the QSTA 213. More particularly, the management unit 212 receives a transmit specification (TSPEC) from the QSTA 213, and orders the transceiver 206 to transmit frames to the QSTA 213 at a schedule responsive to the TSPEC. For example, the management unit 212 may order the transmission of voice over Internet protocol (VoIP) at a schedule of approximately 20 milliseconds between frames.

As mentioned above, the retransmission of the first frame may be used as a power-save interval start indicator. Alternately, a control field or subfield can be used as an indicator. For example, the management unit 212 may order the transceiver 206 to set a "1" bit in the More Data subfield of the Frame Control field in the first frame header. The "1" bit indicates that this is the first transmission of a frame. Then, the management unit can set the More Data subfield to the value of "0" in the retransmitted first frame, in response to receiving the acknowledgement. The "0" bit indicates that the previous acknowledgement was received. Alternately stated, the More Data subfield "0" bit value indicates the start of the power-save interval. Note that the present invention system is not limited to use of any particular field, subfield, or any particular type of control message.

FIG. 3 is a schematic block diagram illustrating details of the QSTA 213 of FIG. 2. FIG. 3 is used to present the present invention system 200 from the point of view of the QSTA. QSTA 213 includes a transceiver 300 having a wireless media port for transmitting and receiving frames (see reference designator 210) and a control port on line 302 to communicate transceived information. A management unit 304 has a signal port connected to the transceiver control port on line 302 to manage transceiving. The management unit 304 orders acknowledgements sent in response to receiving the transmissions (including retransmissions) from the AP 202. The management unit 304 has a timing port on line 306 to communicate timing information. A timer 308 has a port connected to the management unit 304 timing port on line 306 to initiate the timing of the minimum service interval for the management unit, in response to the receipt of the retransmitted first frame.

The management unit 304 identifies the retransmitted first frame as the last frame in the transmission queue and the timer 308 uses the retransmitted first frame as the next minimum service interval timing reference. The management unit 304 sends an acknowledgement to the AP 202 in response to receiving the retransmitted first frame. The management unit 304 orders the transceiver 300 to engage a power-save mode in response to receiving the retransmitted first frame. When the management unit 304 receives a minimum service interval massage from the timer 308, it orders the transceiver 300 to disengage the power-save mode.

Initially, prior to receiving the first frame, the management unit 304 orders the transceiver 300 to transmit a transmit specification (TSPEC) to the AP 202. The TSPEC is used to establish a minimum bandwidth or QoS. The transceiver 300 receives frames from the AP at a schedule responsive to the TSPEC. For example, the transceiver 300 may receive VoIP traffic at a schedule of approximately 20 ms between frames. However, it should be understood that the present invention system is not limited to any particular messaging format or data rate. As another example, management unit 304 may order the engagement of the power-saving mode for approximately 14 ms between frames. The interval timing is determined by the AP and transmitted to the management unit 304. Again, the present invention is not limited to any particular interval.

To use the example presented above in the explanation of FIG. 2, the transceiver 300 may receive the first frame from the AP 202 with a "1" bit in the More Data subfield of the Frame Control field in the first frame header. The transceiver 300 may, likewise, receive the retransmitted first frame with a "0" bit in the More Data subfield. The management unit 304 identifies the retransmitted first frame as the last frame in the transmission queue in response to the "0" bit in the More Data subfield.

Although FIGS. 2 and 3 show only a single QSTA unit, it should be understood that the present invention system may include a plurality of QSTAs in communication with the AP. Further, the transceiver, management unit, and timer elements used to explain the invention should be understood as existing in the context hierarchically layered entities, as developed in the IEEE 802.11e standards.

Functional Description

In proposed QoS enhancements to the IEEE 802.11 MAC, QSTAs can set up traffic specifications (TSPECs) for data delivery from the AP. The AP generally adheres to the specifications given in the TSPEC, in an attempt to ensure that the QSTA receives frames in timely manner. In some types of communication, reliable real-time messaging is critical. For example, with VoIP traffic, frames have a short useful lifetime, on the order of 20 milliseconds.

Using the present invention, the QSTA starts receiving frames from the AP in certain periods designated as a service period (after setting up the TSPEC). Two successive service periods are separated in time by a duration of at least a minimum service interval, which is also referred to herein as a power-save interval. After the QSTA receives an indication from the AP that there are no further frames to be received, the QSTA goes to sleep. The sleep period lasts the minimum service interval, as timed from the end of the preceding service period. Since the beginning of the next service period is dependent upon the timing of the current service period, both the AP and the QSTA must be aware of this timing.

Figure 4:
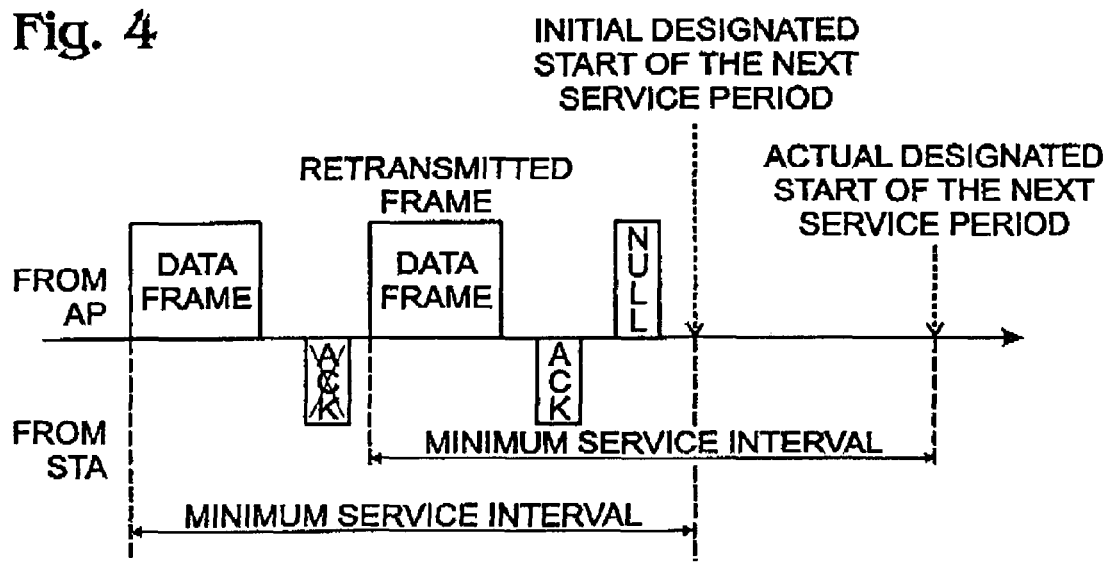
FIG. 4 is a timing diagram illustrating the coordination of the power-save interval.

FIG. 4 is a timing diagram illustrating the coordination of the power-save interval. To alleviate the coordination problem, the AP fails to indicate that there is no data to follow, in its first transmission of the last frame. If the AP receives an acknowledgement, then it will send another frame to indicate to the QSTA that there are no further frames for transmission, as shown in FIG. 4. In this case, the AP knows that the first retransmission of the data frame has been received correctly, it can use of the start of the retransmitted data frame to compute when the QSTA will be awake for the next service period.

In IEEE 802.11 protocol, the indication of whether there are any more frames is managed by using the "More Data" subfield in "Frame Control" field of the header. As noted above, this subfield can be set to "1" for the first frame. That is, a value of "0" should not be used on the first frame even though there are no further frames. Once the frame has been acknowledged, and the acknowledgement is successfully received at the AP, then the AP can send a QoS (+) Null or QoS (+) CF-Poll with TXOP Limit set to 0, with the "More Data" subfield also set to 0, subject to the TXOP ending rule as described in the IEEE 802.11e standards.

Figure 5:
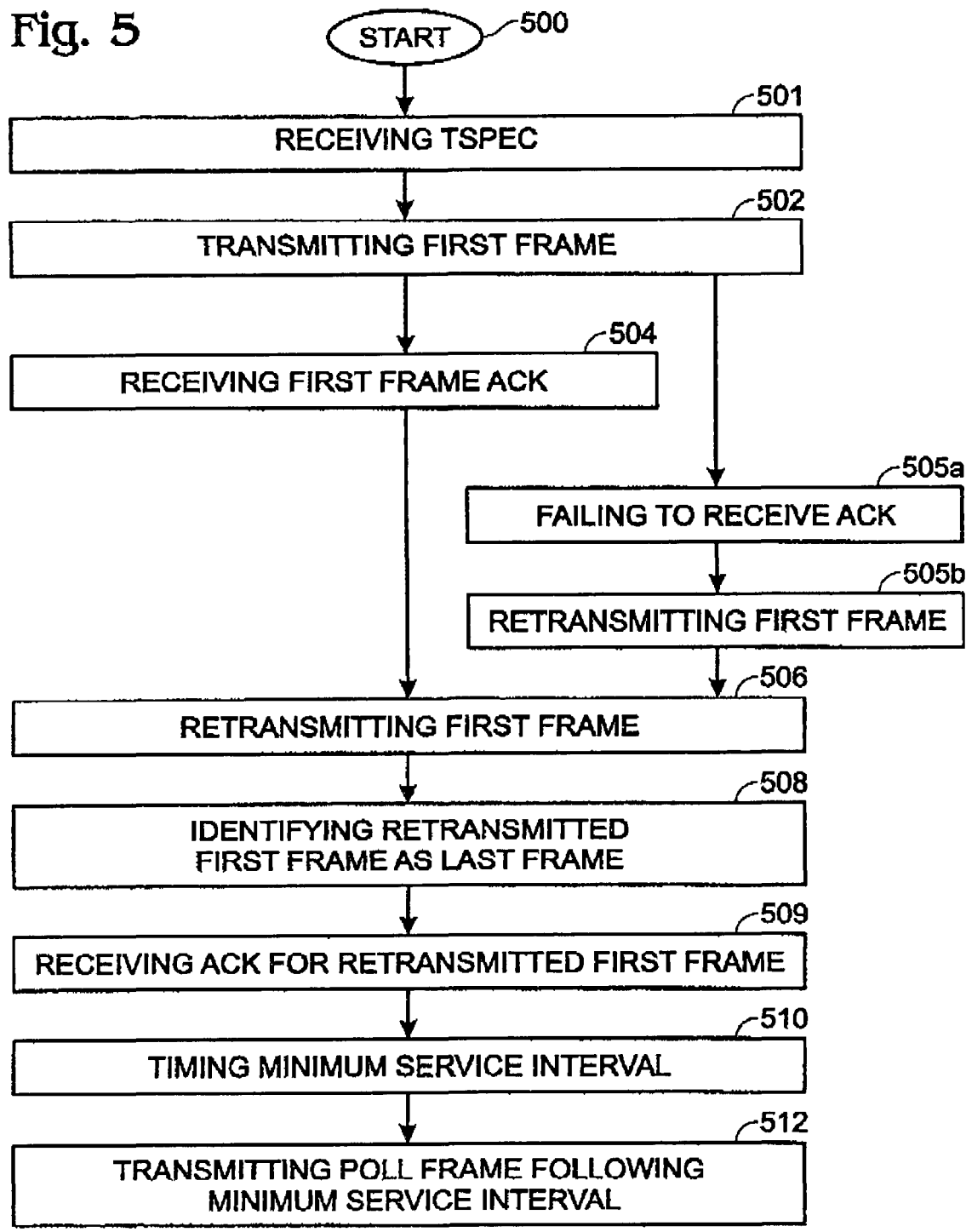
FIG. 5 is a flowchart illustrating the present invention method for coordinating a power-save interval in an IEEE 802.11 wireless network.

FIG. 5 is a flowchart illustrating the present invention method for coordinating a power-save interval in an IEEE 802.11 wireless network. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502 transmits a first frame from an access point (AP) to a quality of service station (QSTA). Step 504 receives an acknowledgement (ACK) from the QSTA. Step 506, in response to receiving the acknowledgement, retransmits the first frame from the AP to the QSTA. Step 508, in response to receiving the first frame acknowledgement, identifies the retransmitted first frame as the last frame in the transmission queue. Step 510 times the next minimum service interval in response to the retransmitted first frame. Step 512, following the minimum service interval, transmits a polling frame from the AP to the QSTA.

In some aspects, Step 510 uses the retransmitted first frame as the next minimum service interval timing reference. Note that the selection of the retransmitted frame as the timing reference is somewhat arbitrary. For example, the STA acknowledgement could be used as reference (ACK+x ms), or the first frame transmission (transmission start time+y ms).

In some aspects a further step, Step 509 receives an acknowledgement responsive to the retransmitted first frame. Then, using the retransmitted first frame as the next minimum service interval timing reference in Step 510 includes using the retransmitted first frame as a timing reference in response to receiving the retransmitted first frame acknowledgement.

In some aspects, Step 505a fails to receive an acknowledgement from the QSTA in response to transmitting the first frame. Step 505b retransmits the first frame until an acknowledgement is received. As noted above in the explanation of FIGS. 2 and 3, the number of retransmission attempts can be made adaptive or set to a fixed number.

In other aspects, Step 501, prior to transmitting the first frame, receives a transmit specification (TSPEC) from the QSTA. Then, transmitting frames from the AP to the QSTA in Step 512 includes transmitting at a schedule responsive to the TSPEC. In one aspect, Step 512 transmits voice over Internet protocol (VoIP) traffic at a schedule of approximately 20 milliseconds between frames.

In another aspect of the method, transmitting a first frame from an AP to a QSTA in Step 502 includes setting the More Data subfield in the Frame Control field of the first frame header to a value of "1". Then, identifying the retransmitted first frame as the last frame in the transmission queue (Step 508) includes setting the More Data subfield to the value of "0".

FIG. 6 is a flowchart illustrating the present invention method for a QSTA to synchronize a power-save interval in an IEEE 802.11 wireless network. The method starts at Step 600. In Step 602 a QSTA receives a first frame from an AP. Step 604 sends an acknowledgement to the AP. Step 605, following the sending of an acknowledgement to the AP (Step 604), remains enabled to receive subsequent transmissions.

Step 606 receives a retransmitted first frame from the AP. Step 608 sends an acknowledgement to the AP responsive to receiving the retransmitted first frame. Step 610 times the next minimum service interval in response to the receipt of the retransmitted first frame. Step 612 engages a power-saving mode during the minimum service interval. Step 614, following the minimum service interval, receives a polling frame from the AP to the QSTA.

In some aspects, receiving a retransmitted first frame in Step 606 includes substeps. Step 606*a* receives the retransmitted first frame from the AP in response to sending the acknowledgement (Step 604). Step 606*b* identifies the retransmitted first frame as the last frame in the transmission queue. Then, timing the next minimum service interval in response to the receipt of the retransmitted first frame (Step 610) includes using the retransmitted first frame as the next minimum service interval timing reference.

In some aspects, Step 601, prior to receiving the first frame, transmits a transmit specification (TSPEC) to the AP. Then, receiving frames from the AP in Step 614 includes receiving frames at a schedule responsive to the TSPEC. For example, Step 614 may receive VoIP traffic at a schedule of approximately 20 ms between frames. As another example, Step 612 may engage a power-saving mode for approximately 14 ms between frames. Again, it should be understood that the method is not limited to any particular communication protocol, service period, or minimum service interval.

In one aspect of the method, receiving a first frame from the AP in Step 602 includes receiving a "1" bit in the More Data subfield of the Frame Control field in the first frame header. Then, identifying the retransmitted first frame as the last frame in the transmission queue (Step 606*b*) includes receiving a "0" bit in the More Data subfield.

A system and method have been presented for synchronizing a power-save, or minimum service interval between transmissions is an IEEE 802.11e wireless communication network. A few examples have been used to illustrate uses and applications of the invention. However, the invention is not limited to merely these examples. While the description of the invention specifically discusses traffic stream data delivery responsive to the use of TSPECs, it has broader application. The invention can be extended to other types of signaling that may arise in the future 802.11 applications, or in other, similar, protocols. Variations and alternate embodiments of the invention will occur to those skilled in the art.

I claim:

1. In an IEEE 802.11 wireless network, a method for coordinating a power-save interval, the method comprising:
   transmitting a first frame from an access point (AP) to a quality of service station (QSTA);
   receiving an acknowledgement from the QSTA, indicating receipt of the first frame;
   in response to receiving the acknowledgement, retransmitting the first frame from the AP to the QSTA; and,
   timing the next minimum service interval in response to the retransmitted first frame.

2. The method of claim 1 further comprising:
   in response to receiving the first frame acknowledgement, identifying the retransmitted first frame as the last frame in a transmission queue; and,
   wherein timing the next minimum service interval in response to the retransmitted first frame includes using the retransmitted first frame as the next minimum service interval timing reference.

3. The method of claim 2 further comprising:
   receiving an acknowledgement responsive to the retransmitted first frame; and,
   wherein using the retransmitted first frame as the next minimum service interval timing reference includes using the retransmitted first frame as a timing reference in response to receiving the retransmitted first frame acknowledgement.

4. The method of claim 3 further comprising:
   failing to receive the acknowledgement from the QSTA in response to transmitting the first frame; and,
   retransmitting the first frame until the acknowledgement is received.

5. The method of claim 4 further comprising:
   following the minimum service interval, transmitting a polling frame from the AP to the QSTA.

6. The method of claim 5 further comprising:
   prior to transmitting the first frame, receiving a transmit specification (TSPEC) from the QSTA; and,
   transmitting frames from the AP to the QSTA at a schedule responsive to the TSPEC.

7. The method of claim 6 wherein transmitting the frames from the AP to the QSTA at the schedule responsive to the TSPEC includes transmitting voice over Internet protocol (VoIP) traffic at a schedule of approximately 20 milliseconds between frames.

8. The method of claim 2 wherein transmitting the first frame from the AP to the QSTA includes setting a More Data subfield in a Frame Control field of the first frame header to a value of "1"; and,
   wherein identifying the retransmitted first frame as the last frame in the transmission queue includes setting the More Data subfield to the value of "0".

9. In an IEEE 802.11 wireless network, a method for a quality of service remote station (QSTA) to synchronize a power-save interval, the method comprising:
   at a QSTA, receiving a first frame from an access point (AP);
   sending an acknowledgement to the AP, indicating receipt of the first frame;
   receiving a retransmitted first frame from the AP;
   sending an acknowledgement to the AP responsive to receiving the retransmitted first frame; and,
   timing the next minimum service interval in response to the receipt of the retransmitted first frame.

10. The method of claim 9 wherein receiving the retransmitted first frame from the AP includes:
    receiving the retransmitted first frame in response to sending the acknowledgement; and,
    identifying the retransmitted first frame as the last frame in a transmission queue; and,
    wherein timing the next minimum service interval in response to the receipt of the retransmitted first frame includes using the retransmitted first frame as the next minimum service interval timing reference.

11. The method of claim 10 further comprising:
    following the minimum service interval, receiving a polling frame from the AP to the QSTA.

12. The method of claim 9 further comprising:
    engaging a power-saving mode during the minimum service interval.

13. The method of claim 12 further comprising:
    prior to receiving the first frame, transmitting a transmit specification (TSPEC) to the AP; and,
    receiving frames from the AP a schedule responsive to the TSPEC.

14. The method of claim 13 wherein receiving frames from the AP at the schedule responsive to the TSPEC includes receiving voice over Internet protocol (VoIP) traffic at a schedule of approximately 20 milliseconds (ms) between frames.

15. The method of claim 14 wherein engaging the power-saving mode during the minimum service interval includes engaging the power-saving mode for approximately 14 ms between frames.

16. The method of claim 10 wherein receiving the first frame from the AP includes receiving a "1" bit in a More Data subfield of a Frame Control field in the first frame header; and,
wherein identifying the retransmitted first frame as the last frame in the transmission queue includes receiving a "0" bit in the More Data subfield.

17. The method of claim 9 further comprising:
following the sending of the acknowledgement to the AP, remaining enabled to receive subsequent transmissions.

18. In an IEEE 802.11 wireless network, a system for coordinating a power-save interval, the system comprising:
an access point (AP) including:
a transceiver having a wireless media port for transmitting and receiving frames and a control port to communicate transceived information;
a management unit having a signal port connected to the transceiver control port to manage transceiving, the management unit ordering the transmission of a first frame to a quality of service station (QSTA), and the retransmission of the first frame in response to the transceiver receiving an acknowledgement of the receipt of the first frame, the management unit having a timing port to communicate timing information; and,
a timer having a port connected to the management unit timing port to initiate the timing of a minimum service interval for the management unit in response to the receipt of the first frame acknowledgement.

19. The system of claim 18 wherein the management unit orders the transceiver to identify the retransmitted first frame as the last frame in a transmission queue in response to receiving the acknowledgement, and,
wherein the timer uses the retransmitted first frame as the next minimum service interval timing reference.

20. The system of claim 19 wherein the management unit receives an acknowledgement for the retransmitted first frame and orders the timer to use the retransmitted first frame as the next minimum service interval timing reference in response to receiving the retransmitted first frame acknowledgment.

21. The system of claim 20 wherein the management unit, in response to failing to receive the acknowledgement of the transmitted first frame, orders the transceiver to retransmit the first frame until the acknowledgement is received.

22. The system of claim 21 wherein the management unit, following the receipt of a minimum service interval message from the timer, orders the transceiver to transmit a polling message to the QSTA.

23. The system of claim 22 wherein the management unit receives a transmit specification (TSPEC) from the QSTA, and orders the transceiver to transmit frames to the QSTA at a schedule responsive to the TSPEC.

24. The system of claim 23 wherein the management unit orders the transmission of voice over Internet protocol (VoIP) at a schedule of approximately 20 milliseconds between frames.

25. The system of claim 19 wherein the management unit orders the transceiver to set a "1" bit in the More Data subfield of a Frame Control field in the first frame header and to set a More Data subfield to the value of "0" in the retransmitted first frame, in response to receiving the acknowledgement.

26. The system of claim 18 further comprising:
a QSTA including:
a transceiver having a wireless media port for transmitting and receiving frames and a control port to communicate transceiving information;
a management unit having a signal port connected to the transceiver control port to manage transceiving, the management unit ordering acknowledgements sent in response to receiving a first frame in a transmissions a from the AP, the management unit having a timing port to communicate timing information; and,
a timer having a part connected to the management unit timing port to initiate the timing of the minimum service interval for the management unit in response to the receipt of the retransmitted first frame.

27. In an IEEE 802.11 wireless network, a system for synchronizing to a power-save interval, the system comprising:
a quality of service station (QSTA) including:
a transceiver having a wireless media port for transmitting and receiving frames and a control port to communicate transceived information;
a management unit having a signal port connected to the transceiver control port to manage transceiving, the management unit receiving a transmitted and retransmitted first frame and ordering an acknowledgement a sent in response to receiving the first frame transmission a from an access point (AP), the management unit having a timing port to communicate timing information; and,
a timer having a port connected to the management unit timing port to initiate the timing of a minimum service interval for the management unit in response to the receipt of the retransmitted first frame.

28. The system of claim 27 wherein the management unit identifies the retransmitted first frame as the last frame in a, transmission queue; and,
wherein the timer uses the retransmitted first frame as the next minimum service interval timing reference.

29. The system of claim 28 wherein the management unit sends an acknowledgement to the AP in response to receiving the retransmitted first frame.

30. The method of claim 29 wherein the management unit order the transceiver to engage a power-save mode in response to receiving the retransmitted first frame.

31. The system of claim 30 wherein the management unit receives a minimum service interval massage from the timer and orders the transceiver to disengage the power-save mode in response to receiving the minimum service interval message.

32. The system of claim 31 wherein the management unit, prior to receiving the first frame, orders the transceiver to transmit a transmit specification (TSPEC) to the AP; and,
wherein the transceiver receives frames from the AP at a schedule responsive to the TSPEC.

33. The system of claim 32 wherein the transceiver receives voice over Internet protocol (VoIP) traffic at a schedule of approximately 20 milliseconds (ms) between frames.

34. The system of claim 33 wherein management unit orders the engagement of the power-saving mode for approximately 14 ms between frames.

35. The system of claim 28 wherein the transceiver receives the first frame from the AP with a "1" bit in a More Data subfield of a Frame Control field in the first frame header, and receives the retransmitted first frame with a "0" bit in the More Data subfield; and,
wherein the management unit identifies the retransmitted first frame as the last frame in the transmission queue in response to the "0" bit in the More Data subfield.

36. The system of claim 27 further comprising:
an access point (AP) including:
a transceiver having a wireless media port for transmitting and receiving frames and a control port to communicate transceiving information;
a management unit having a signal port connected to the transceiver control port to manage transceiving, the management unit ordering the transmission of the first frame to the QSTA, and the retransmission of the first frame in response to the transceiver receiving an acknowledgement of the fret frame, the management unit having a timing port to communicate timing information; and,
a timer having a port connected to the management unit timing port to initiate the timing of the minimum service interval for the management unit in response to the receipt of the first frame acknowledgement.

* * * * *